United States Patent
Kern

[19]
[11] Patent Number: 5,962,990
[45] Date of Patent: Oct. 5, 1999

[54] CONTROL UNIT FOR RAPIDLY STARTING THE ILLUMINATION OF A HIGH-PRESSURE GAS-DISCHARGE LAMP

[75] Inventor: Robert Kern, Sasbachwalden, Germany

[73] Assignee: Robert Bosch GmbH, Stuttgart, Germany

[21] Appl. No.: 09/043,455

[22] PCT Filed: May 18, 1996

[86] PCT No.: PCT/DE96/00876
§ 371 Date: May 21, 1998
§ 102(e) Date: May 21, 1998

[87] PCT Pub. No.: WO97/11581
PCT Pub. Date: Mar. 27, 1997

[30] Foreign Application Priority Data

Sep. 20, 1995 [DE] Germany .......................... 195 34 864

[51] Int. Cl.$^6$ ............................................. G05F 1/00
[52] U.S. Cl. ................... 315/307; 315/287; 315/224; 315/118; 315/DIG. 2
[58] Field of Search ..................... 315/307, 308, 315/287, 224, 360, 82, DIG. 2, 209 R, 118

[56] References Cited

U.S. PATENT DOCUMENTS

| | | | |
|---|---|---|---|
| 5,103,143 | 4/1992 | Daub | 315/308 |
| 5,151,634 | 9/1992 | Nepote et al. | 315/307 |
| 5,463,287 | 10/1995 | Kurihara et al. | 315/307 |

FOREIGN PATENT DOCUMENTS

| | | |
|---|---|---|
| 0 644 710 | 3/1995 | European Pat. Off. . |
| 41 36 486 | 5/1993 | Germany . |

OTHER PUBLICATIONS

"System Specification for Field Test", VEDILIS Eureka Project No. 273, p. B 1/3.

Primary Examiner—Haissa Philogene
Attorney, Agent, or Firm—Kenyon & Kenyon

[57] ABSTRACT

A d.c. voltage source delivers the voltage at its output terminals. This voltage is converted to a higher voltage level by a d.c./d.c. converter. This higher voltage level forms the input voltage to a controlled power-supply circuit. From this, the power-supply circuit forms the supply voltage and supply current for a high-pressure gas-discharge lamp to supply it with burning energy. A control circuit is provided to control the power-supply circuit, and an ignition circuit (9) is provided for the ignition. The power-supply circuit is controlled by the control circuit so that the high-pressure gas-discharge lamp is operated with a defined overload when illumination is started. In this context, the overload is defined so as to prevent flickering or light-saddles. The overload is controlled by the control circuit as a function of the state of the high-pressure gas discharge lamp. In so doing, the control circuit takes into account the temperature of the high-pressure gas-discharge lamp, subdivided according to the temperature of the electrodes and the temperature of the gas of the high-pressure gas-discharge lamp.

10 Claims, 1 Drawing Sheet

CONTROL UNIT FOR RAPIDLY STARTING THE ILLUMINATION OF A HIGH-PRESSURE GAS-DISCHARGE LAMP

FIELD OF THE INVENTION

The present invention relates to a control unit for rapidly starting an illumination of a high-pressure gas-discharge lamp, in particular for use in motor vehicle headlights.

BACKGROUND INFORMATION

German Patent Application No. 41 36 486 describes a ballast for starting and operating a.c. high-pressure gas-discharge lamps, the ballast is supplied from a d.c. voltage source, for example, from the battery of a motor vehicle. In this context, initially a stabilized and/or power-regulated d.c. voltage, having a higher voltage level, is produced by means of a d.c./d.c. converter from the d.c. voltage of a d.c. voltage source. Then the alternating current required to operate the lamp is produced from this voltage with the aid of a controlled bridge circuit. The bridge circuit can be operated as a direct-current and as an alternating-current circuit, and it forms the power-supply circuit for the high-pressure gas-discharge lamp. The bridge circuit is controlled by a control circuit, and an ignition device is provided to ignite the high-pressure gas-discharge lamp.

In this conventional ballast, in order to achieve a rapid and reliable ignition, as well as to rapidly and reliably achieve a stable burning state without the lamp flickering, during initial operation, the bridge circuit is operated as a d.c. circuit. A signal is generated by a status-defining device when the high-pressure gas-discharge lamp is successfully ignited. This signal is fed via a time-delay circuit to the control circuit for the bridge circuit, ensuring that, only after the requisite period of delay, the bridge circuit is switched over from d.c. operation to a.c. operation. The approach described above differs from the approach provided by the present invention.

For the open-loop control when starting a high-pressure gas-discharge lamp, the Vedilis curve is usually preset as the current-/voltage curve, in the sense of a reference curve. The Vedilis curve is described in the "System Specifications for Field Test" of the VEDILIS Eureka Project No. 273 on Page B 1/3, and it is preset as the current-/voltage characteristic for gas-discharge lamps used in motor vehicles. "Vedilis" in this connection is an acronym standing for "Vehicle Discharge Light System." Thereupon, for the closed-loop control of the lamp power of a gas-discharge lamp, the lamp voltage $U_L$ is measured in the start-up or burn phase and the corresponding lamp current $I_L$, belonging to the respective lamp voltage $U_L$, is determined from the Vedilis curve. This lamp current $I_L$ then serves as a reference value for the subsequent current closed-loop control circuit by means of which the lamp power is controlled in closed loop to a constant value such as 35 W.

To use a gas-discharge lamp in motor vehicle headlights it is usually necessary to provide as much illumination as possible within a short period of time after switching the control unit on. This is described as a rapid starting of the illumination. As shown by the above-described Vedilis curve, for this purpose, the gas-discharge lamp can be operated with a specific overload immediately after being turned on. In this context, this overload is driven back as a function of the lamp voltage. The lamp should not be destroyed or have its service life adversely affected as a result of such an overload. This requirement must be observed for all operating states. Furthermore, the control must be selected such that the light output does not swing back again from an already attained value, because this is generally perceived as an unpleasant flickering. This swinging back of the light output is also characterized as a light-saddle effect.

It has been shown in practice that a control in accordance with the above-mentioned Vedilis curve cannot avoid generating light-saddles. Consequently, alternative methods are sought. It is generally possible to conduct the overload operation of the gas-discharge lamp by using a simple timing. In this connection, however, it should be seen as particularly disadvantageous that the respective state of the gas-discharge lamp is fully ignored. This can result in the destruction of the gas-discharge lamp or, at least, in a shortening of its service life.

SUMMARY OF THE INVENTION

In contrast, the control unit of the present invention, which is used to rapidly start an illumination of a high-pressure gas discharge lamp, has the advantage that it precisely adjusts the overload operation of the high-pressure gas-discharge lamp to its respective state, while avoiding light-saddles and any harmful effects on the service life of the high-pressure gas-discharge lamp.

According to the present invention, the control circuit controls the power-supply circuit such that the high-pressure gas-discharge lamp, when the illumination is started, is operated with a defined overload so that flickering and light-saddles are avoided, and that this overload is controlled by the control circuit as a function of the state of the high-pressure gas-discharge lamp, especially as a function of the temperature of the high-pressure gas-discharge lamp.

For that purpose, in an advantageous embodiment of the present invention, control circuit takes into account the temperature of the high-pressure gas-discharge lamp, subdivided according to the temperature of the electrodes and the temperature of the gas of the high-pressure gas-discharge lamp. In accordance with a further embodiment of the present invention, in order to ascertain the state of the high-pressure gas-discharge lamp, the control circuit monitors the current and/or voltage characteristic of the high-pressure gas-discharge lamp and of the power-supply circuit, respectively, immediately after the ignition process, and the current-/voltage profiles, characteristic for the various states of the high-pressure gas-discharge lamp, arising in connection with the internal resistance of the power supply circuit are determined, the current-/voltage characteristics differ significantly with the varying states of the high-pressure gas-discharge lamp.

In another embodiment of the present invention, in ascertaining the state of the high-pressure gas-discharge lamp by the control circuit with the assistance of the current- and/or voltage characteristic of the high-pressure gas-discharge lamp and of the power-supply circuit, respectively, not only current- and/or voltage limiting values are taken into consideration, but also, in particular, the dynamic curve shapes in the initial time period after the ignition process.

In yet another embodiment of the present invention, the control circuit contains a microcontroller which carries out in the control circuit the observations required for ascertaining the state of the high-pressure gas-discharge lamp and determines the appertaining states.

In a further embodiment of the present invention, the microcontroller, as a function of the detected state of the high-pressure gas-discharge lamp, carries out the following essential control measures:

When the high-pressure gas-discharge lamp is cold, maintaining the output current of the power-supply circuit at a high level using a time-restricted overload function, When the high-pressure gas-discharge lamp is hot, lowering the lamp power to the nominal value immediately after recognition, and When the high-pressure gas-discharge lamp is warm, lowering the lamp power to a weak overload.

In an advantageous embodiment of the invention, the overload function for controlling the overload applied is a combination of a time-program control and of a control dependent upon the operating voltage. It is beneficial if the overload function is time-restricted.

DETAILED DESCRIPTION OF THE INVENTION

Figure 1:
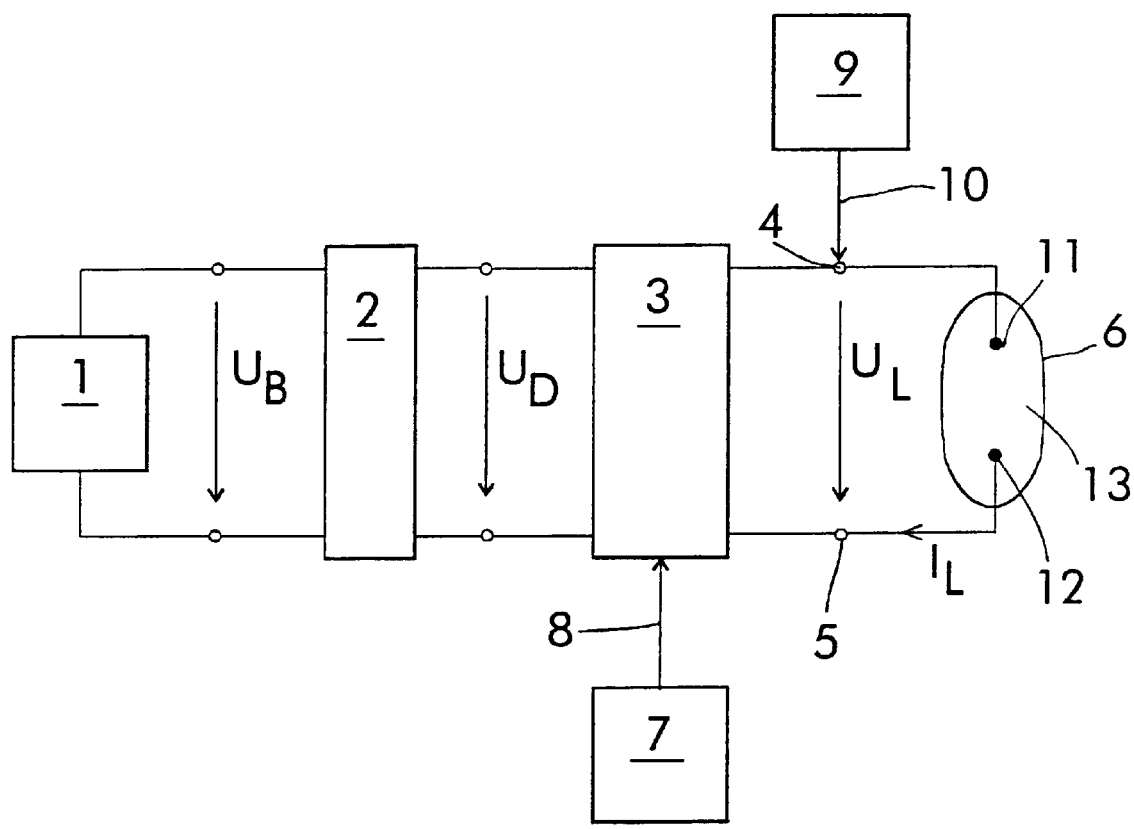
FIG. 1 shows a schematic block diagram of a control unit according to the present invention.

FIG. 1 shows a schematic block diagram of a control unit according to the present invention. The d.c. voltage source is designated as 1, and is potentially the battery of a motor vehicle. D.C. voltage source 1, delivers voltage $U_B$ at its output terminals. This voltage $U_B$ is converted or stepped up to a higher voltage level by a d.c. voltage/d.c. voltage converter 2 (d.c./d.c. converter). This higher voltage level $U_D$ is available at the output terminals of d.c./d.c. converter 2. D.C/D.C. converter 2 forms the input voltage to a controlled power-supply circuit 3, which can be a bridge circuit or contain a bridge circuit. Power supply circuit 3 generates a controlled alternating current and an alternating voltage, respectively, or a controlled direct voltage. This alternating voltage or direct voltage is available at output terminals 4 and 5 and forms the power-supply voltage $U_L$ of a high-pressure gas-discharge lamp 6 to supply high-pressure gas-discharge with lamp burning energy. To controlled power-supply circuit 3, a control circuit 7 supplies its control pulses via lines 8, to controlled power-supply circuit 3. Additionally, an ignition circuit 9, via line 10 indicated by an arrow, supplies igniting voltage via terminal 4 to high-pressure gas-discharge lamp.

Accordance to the present invention, power-supply circuit 3 is controlled by control circuit 7 such that high-pressure gas-discharge lamp 6 is operated with a defined overload when illumination is started. The overload in this context is set so as to avoid flickering and light-saddles. Furthermore, this overload is controlled by control circuit 7 as a function of the state of high-pressure gas-discharge lamp 6, in particular of the temperature of high-pressure gas-discharge lamp 6. In an advantageous manner, control circuit 7 takes account of the temperature of high-pressure gas-discharge lamp 6, sub-divided according to the temperature of electrodes 11, 12 and the temperature of gas 13 of high-pressure gas-discharge lamp 6.

There are three essential states of the high-pressure gas-discharge lamp 6, specifically cold, hot, and warm, which are explained below with their characteristics and peculiarities.

A cold high-pressure gas-discharge lamp 6 is present when high-pressure gas-discharge lamp 6 has not been switched on for a longer period and has completely cooled off. Electrodes 11 and 12 and gas 13 are then cold. The cold high-pressure gas-discharge lamp 6 can be operated with marked overload so as to produce a large amount of light more quickly. In this context, control circuit 7 ensures that there is no thermal erosion of electrodes 11 and 12 as a result of the defined electrical overload which would shorten the service life of high-pressure gas-discharge lamp 6. A cold high-pressure gas-discharge lamp 6 exhibits a very slight operating voltage immediately after being switched on, the operating voltage amounts to somewhat less than half the standard operating voltage.

A hot high-pressure gas-discharge lamp 6 is present when the lamp has initially achieved full temperature due to a longer burning operation, and then is subsequently switched off for a short time. The typical duration of the switch-off time in this example amounts to about one second. Electrodes 11 and 12 and gas 13 are then hot. If a hot high-pressure gas-discharge lamp 6 is then switched on or switched on again, it does not have to be operated with an overload in order to achieve a rapid start of illumination. Such overload operation also is not acceptable, since it would reduce the life expectancy of high-pressure gas-discharge lamp 6 because of the thermal overload.

A warm high-pressure gas-discharge lamp 6 is present when the lamp has initially reached full temperature due to a longer burning operation, and is then shut off for several seconds. The typical duration of the switch-off time in this example amounts to about 10 seconds. Gas 13 still has a high temperature because of the relatively good insulation. As a consequence, there is also still high pressure in high-pressure gas-discharge lamp 6. Electrodes 11 and 12 are already highly cooled off, however, because their metal terminals dissipate heat very efficiently. When a warm lamp is switched on again, a precisely defined weak overload is used according to the present invention in order to achieve rapid start of illumination.

For the reliable takeover of high-pressure gas-discharge lamp 6 from the ignition state into the static operating state on the one hand, and, on the other hand, to preserve the service life of high-pressure gas-discharge lamp 6, it is important to differentiate reliably among the various states of high-pressure gas-discharge lamp 6.

Advantageously, control circuit 7, according to the present invention, contains a microcontroller. This microcontroller is not shown in FIG. 1. Using this microcontroller, which acts as an observer, control circuit 7 performs the necessary observations for determining the state of high-pressure gas-discharge lamp 6, and determines the appertaining states. For this purpose, control circuit 7 first sets output current $I_L$ of power-supply circuit 3 to a high level. This is necessary so that even a cold high-pressure gas-discharge lamp 6 can reliably assume the burning operation. Since the ignition process commences with a time delay after is switched on, the no-load voltage arises at power-supply circuit 3.

Immediately after the ignition process, e.g., in the first 5 milliseconds, control circuit 7 determines the current- and/or voltage profiles of high-pressure gas-discharge lamp 6 and of power-supply circuit 3, respectively, and the current-/voltage profiles resulting at the same time in connection with the internal resistance of power supply circuit 3. These profiles are characteristic for the various states of high-pressure gas-discharge lamp 6, and they differ significantly according to the different states of high-pressure gas-discharge lamp 6. In an advantageous manner, in determining the state of high-pressure gas-discharge lamp 6 by control circuit 7 with the assistance of the current- and/or voltage characteristic of high-pressure gas-discharge lamp 6 and of power-supply circuit 3, respectively, not only the current- and/or voltage limiting values are taken into consideration, but also, in particular, the dynamic curve shapes in the initial time period after the ignition process. Observing the dynamic profiles makes for a more accurate differentiation than can be achieved through merely sampling one point in time.

Control circuit 7, in particular using the microcontroller, according to the present invention and as a function of the detected state, carries out the following essential control measures:

When high-pressure gas-discharge lamp 6 is cold, maintaining the output current of the power-supply circuit at a high level by a time-restricted overload function. The overload function applied is precisely defined. It can be a combination of a time-program control and a control dependent upon the operating voltage. It is limited in time. Since, when high-pressure gas-discharge lamp 6 is cold, the interior gas pressure must first be built up, this state is especially sensitive as regards light-saddles. A time-controlled compensation can prevent a drop in the light power. When high-pressure gas-discharge lamp 6 is hot, lowering the lamp power to the nominal value immediately after recognition. Thus, it is switched immediately into the standard, static, burning operation at nominal capacity. Thermal overload is thereby avoided.

When high-pressure gas-discharge lamp 6 is warm, lowering the lamp power to a weak overload. This overload also is precisely defined. It also can be a combination of a time-program control and a control dependent upon the operating voltage. However, in this case, it is not necessary to compensate for the possibility of light-saddles, since there is still gas pressure in high-pressure gas-discharge lamp 6.

The control unit configured according to the present invention provides for high-pressure gas-discharge lamp 6 optimally with respect to both functionality and service life, under all states which occur.

What is claimed is:

1. A control unit for rapidly starting an illumination of a high-pressure gas-discharge lamp, comprising:
    a power-supply circuit generating a lamp current and a lamp voltage as a function of a direct voltage, provided by a direct-voltage source, for supplying a burning energy to the high-pressure gas-discharge lamp;
    a control circuit controlling the power-supply circuit for operating the high-pressure gas-discharge lamp with an overload when the illumination is started; and
    an ignition device igniting the high-pressure gas-discharge lamp,
wherein, when the illumination is started, the overload is controlled by the control circuit as a function of a temperature of the high-pressure gas-discharge lamp to eliminate one of a flickering effect and a light-saddle effect in the high-pressure gas-discharge lamp.

2. The control unit according to claim 1, wherein the high-pressure gas-discharge lamp is a motor vehicle headlight.

3. The control unit according to claim 1, wherein the power-supply circuit includes a d.c. circuit and an a.c. circuit.

4. The control unit according to claim 1, wherein the high-pressure gas-discharge lamp includes electrodes and encloses a gas, and
    wherein the temperature of the high-pressure gas-discharge lamp includes a temperature of the electrodes and a temperature of the gas.

5. The control unit according to claim 1, wherein, immediately after igniting the high-pressure gas-discharge lamp, the control circuit monitors at least one of a current profile and a voltage profile of the high-pressure gas-discharge lamp, and monitors at least one of a current profile and a voltage profile of the power-supply circuit, the profiles being monitored to determine a state of the high-pressure gas-discharge lamp, and
    wherein the control circuit determines the profiles as a function of an internal resistance of the power-supply circuit, one of the profiles being different from another one of the profiles as a function of different states of the high-pressure gas-discharge lamp.

6. The control unit according to claim 5, wherein, during an initial time period after the high-pressure gas-discharge lamp is ignited, the state of the high-pressure gas-discharge lamp is determined as a function of at least one of current limiting values and voltage limiting values, and as a further function of dynamic curve shapes.

7. The control unit according to claim 1, wherein the control circuit includes a microcontroller, the microcontroller monitoring the high-pressure gas-discharge lamp and determining a state of the high-pressure gas-discharge lamp.

8. The control unit according to claim 7, wherein the microcontroller performs the following functions using the determined state of the high-pressure gas-discharge lamp:
    when the microcontroller determines that the high-pressure gas-discharge lamp is cold, maintaining an output current of the power-supply circuit at a high level using a time-restricted overload function,
    when the microcontroller determines that the high-pressure gas-discharge lamp is hot, decreasing a lamp power to a nominal value immediately after the microcontroller determines that the high-pressure gas-discharge lamp is hot, and
    when the microcontroller determines that the high-pressure gas-discharge lamp is warm, decreasing the lamp power to a weak overload value.

9. The control unit according to claim 1, wherein the overload is controlled by applying an overload function to the control circuit, the overload function including a time-program control function and an operating voltage-dependent control function.

10. The control unit according to claim 1, wherein the overload is controlled using an overload function, the overload function being time-restricted.

* * * * *